Patented Dec. 18, 1928.

1,695,631

UNITED STATES PATENT OFFICE.

ROBERT BERLINER, BERTHOLD STEIN, AND WILLY TRAUTNER, OF ELBERFELD, GERMANY, ASSIGNORS TO GRASSELLI DYESTUFF CORPORATION, OF NEW YORK, N. Y., A CORPORATION OF DELAWARE.

VAT DYESTUFF DERIVED FROM 2-HALOGEN-1.9-PYRAZOLANTHRONE.

No Drawing. Application filed February 4, 1927, Serial No. 166,005, and in Germany March 3, 1926.

The present invention concerns the manufacture of new vat dyestuffs from 2-halogen-1.9-pyrazolanthrones or their derivatives or substitution products, by heating the same to an elevated temperature, advantageously in a suitable solvent, in the presence of an agent combining with acid such as, for example, an alkali metal acetate, and with the further addition of traces of metals or metal compounds, such as copper or copper salts, acting as catalysts.

The following example will illustrate our invention, it being understood that we do not intend to limit ourselves to the proportions given, nor to the exact mode of working:

A solution of 3 parts by weight of 2-bromo-1.9-pyrazolanthrone, 1.2 parts by weight of potassium acetate and 0.1 part by weight of copper acetate in 20 volumes of nitrobenzene is heated to boiling for several hours with constant stirring. The reaction is interrupted when a test portion of the melt shows the presence only of small quantities of the starting material. The precipitate which separates from the melt after cooling is filtered off, boiled with alcohol and, if necessary, any unchanged 2-bromo-1.9-pyrazolanthrone is removed by extracting the same with dilute caustic soda solution. The residue is a reddish-brown powder consisting of the dyestuff having most probably the formula:

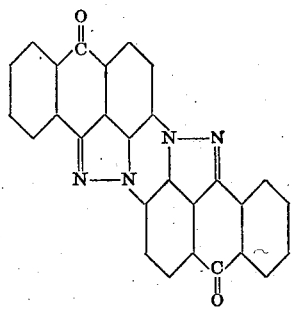

which crystallizes from nitrobenzene (in which it is soluble with great difficulty) in fine, small, brownish-red needles. The nitrobenzene solution exhibits a green fluorescence. The crystalline product thus obtained dissolves in concentrated sulphuric acid with a pure deep blue coloration and the diluted solution exhibits a well defined characteristic absorption spectrum. On pouring the sulphuric acid solution into water the dyestuff is precipitated in red flakes. It dyes cotton from a blue vat in blue shades; oxidation of the dyeing causes the initial blue to change into a powerful clear red shade possessing excellent fastness properties.

The 2-bromo-1.9-pyrazolanthrone can be prepared, for example, according to the processes of German Patents Nos. 163,447 and 171.293 by converting 1-amino-2-bromoanthraquinone into the diazo compound, from which the hydrazine derivative is produced, and converting the latter into the pyrazolone derivatives by internal condensation. The 2-bromo-1.9-pyrazolanthrone forms bright yellow crystals which are soluble in caustic soda lye with an orange-red coloration and in concentrated sulphuric acid with an orange coloration.

The so-called pyrazolanthrone yellow which is formed by the alcoholic caustic fusion of pyrazolanthrone and which was stated in German Patent No. 255,641 to have the probable constitution given above for the product of the present invention, has been shown by F. Meyer (Berichte, 55B, pp. 2155–2164) to have properties incompatible with this constitution.

Having now particularly described and ascertained the nature of our said invention and in what manner the same is to be performed, we declare that what we claim is:

1. Process for the manufacture of vat dyestuffs of the anthraquinone series which comprises condensing 1.9-pyrazolanthrone compounds which are substituted in the 2-position by halogen, by heating said compounds to an elevated temperature in the presence of a suitable solvent, an acid-binding salt, and a catalytically acting substance containing metallic atoms.

2. Process for the manufacture of vat dyestuffs of the anthraquinone series which comprises condensing 1.9-pyrazolanthrone compounds which are substituted in the 2-position by halogen, at the boiling temperature in the presence of nitrobenzene, an acid binding agent and a catalytically acting compound of copper.

3. Process for the manufacture of a vat dyestuff of the anthraquinone series which comprises boiling a nitrobenzene solution of 2-bromo-1.9-pyrazolanthrone in the presence of an alkali metal acetate and a catalytically acting compound of copper.

4. As new products vat dyestuffs of the anthraquinone series substantially identical with those obtainable by condensing 1.9-pyrazolanthrone compounds which are substituted in the 2-position by halogen, by heating said compounds to an elevated temperature in the presence of a suitable solvent, an acid-binding salt and a catalytically acting substance containing metallic atoms.

5. As a new product the vat dyestuff of the anthraquinone series having most probably the formula:

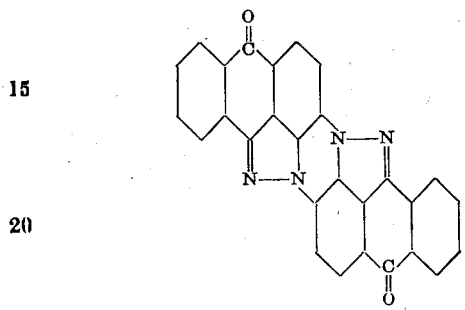

which dyestuff is in dry, purified form a reddish-brown powder only slightly soluble in the usual organic solvents, soluble in boiling nitrobenzol with a green fluorescence, crystallizing therefrom upon cooling in the form of fine, small brownish-red needles which are soluble in concentrated sulphuric acid with a deep blue color, and dyes cotton from a blue vat blue shades changing upon oxidation into a powerful clear red shade of excellent fastness properties.

6. Materials dyed with the vat dyestuffs defined in claim 4.

7. Materials dyed with the vat dyestuffs defined in claim 5.

In testimony whereof, we affix our signatures.

ROBERT BERLINER.
BERTHOLD STEIN.
WILLY TRAUTNER.